United States Patent
Dusevic

(10) Patent No.: US 6,712,403 B1
(45) Date of Patent: Mar. 30, 2004

(54) FLANGE CONNECTOR

(75) Inventor: Tony Dusevic, Highland, IN (US)

(73) Assignee: Tuthill Corporation, Burr Ridge, IL (US)

( * ) Notice: Subject to any disclaimer, the term of this patent is extended or adjusted under 35 U.S.C. 154(b) by 112 days.

(21) Appl. No.: 10/107,900

(22) Filed: Mar. 27, 2002

(51) Int. Cl.[7] ............................................. F16L 23/16
(52) U.S. Cl. ..................... 285/368; 285/363; 285/414
(58) Field of Search ............................. 285/363, 368, 285/414, 405

(56) References Cited

U.S. PATENT DOCUMENTS

| | | | |
|---|---|---|---|
| 2,305,377 A | | 12/1942 | Corey |
| 2,891,746 A | | 6/1959 | Pesel |
| 3,022,740 A | | 2/1962 | Wilfley et al. |
| 3,214,203 A | * | 10/1965 | Mongodin ................. 285/368 |
| 3,455,583 A | * | 7/1969 | Ray ........................... 285/368 |
| 3,587,010 A | | 6/1971 | Walsh |
| 4,000,921 A | * | 1/1977 | Daspit ....................... 285/368 |
| 4,225,161 A | * | 9/1980 | Smith ........................ 285/349 |
| 4,294,477 A | * | 10/1981 | Ahlstone ................... 285/363 |
| 4,616,860 A | * | 10/1986 | Faria et al. ............... 285/368 |
| 4,672,728 A | * | 6/1987 | Nimberger ................ 285/161 |
| 5,236,228 A | | 8/1993 | Lawton |
| 5,338,075 A | * | 8/1994 | Albrecht .................... 285/368 |
| 5,437,482 A | | 8/1995 | Curtis |
| 5,472,245 A | | 12/1995 | Meske et al. |
| 5,492,373 A | * | 2/1996 | Smith ........................ 285/368 |
| 5,813,706 A | | 9/1998 | Travis |
| 5,829,794 A | * | 11/1998 | Schulz-Hausmann et al. ............................ 285/368 |
| 5,857,717 A | | 1/1999 | Caffrey |
| 6,299,216 B1 | * | 10/2001 | Thompson ................ 285/93 |

* cited by examiner

Primary Examiner—Eric K. Nicholson
(74) Attorney, Agent, or Firm—Barnes & Thornburg

(57) ABSTRACT

This invention is directed to a novel multi-piece flange connector used for connecting a pump housing to a fluid conduit. The pump flange is comprised of a flange blank, an insert plate, and a seal. The flange blank is adapted to be connected to the housing of a pump and includes a central bore adapted to allow the passage of fluid. The flange blank also includes a recess surrounding the bore that is adapted to accept the insert plate and the seal. The flange blank is connected to the pump housing by the use of bolts or other fasteners that pass through apertures in the flange blank beneath the insert plate. The insert plate includes a seal member that prevents fluid from the central bore from leaking outside of the flange.

18 Claims, 2 Drawing Sheets he present invention relates to flange connectors, more
FLANGE CONNECTOR

BACKGROUND OF THE INVENTION

The present invention relates to flange connectors, more particularly to pump flanges for use in connecting piping to a pump housing. Flanges are used commercially to connect fluid transfer pipes of different diameters to pump housings from various manufacturers having varying bolt circle patterns. Variations in pump housings and piping require the use of different flanges to mate the plumbing to the housing. Flanges of this type typically include a first mating surface dimensioned to seal against a pipe flange and a second mating surface dimensioned to seal against a pump housing surface. Once connected the arrangement is expected to effectively transfer fluid from the pump through the piping without fluid leakage. The second mating surface is required to be spaced apart from the first mating surfaces to create a gap between surfaces to allow for the connection of bolts. Often, due to installation restrictions, the surfaces are manufactured close together rendering it difficult to install or remove the mounting bolts. Prior art pump flanges do not provide for a compact flange design for tight mounting locations.

SUMMARY OF THE INVENTION

The present invention is directed to a multi-piece pump flange for connecting inlet or outlet piping to a pump housing. The pump flange is comprised of a flange blank, an insert plate, and a seal member. The flange blank is adapted to be connected to the housing of a pump and includes a central bore adapted to allow the passage of fluid. The flange blank also includes a recess surrounding the bore that is adapted to accept the insert plate and the seal. The flange blank is connected to the pump housing by the use of bolts that pass through apertures in the flange blank beneath the insert plate. The insert plate retains the seal, which prevents fluid from leaking from the central bore to the outside of the flange. The insert plate is connected to the assembly to create a liquid tight seal. This arrangement allows the flange to have a shorter overall height, allowing it to be used in locations where dimensional requirements are limited. The flange of the present invention also allows for the ready interchangeability of one manufacturer's pump for another in a predesigned system.

These and other aspects of this invention are illustrated in the accompanying drawings and are more fully described in the following specification.

DETAILED DESCRIPTION OF THE INVENTION

Figure 1:
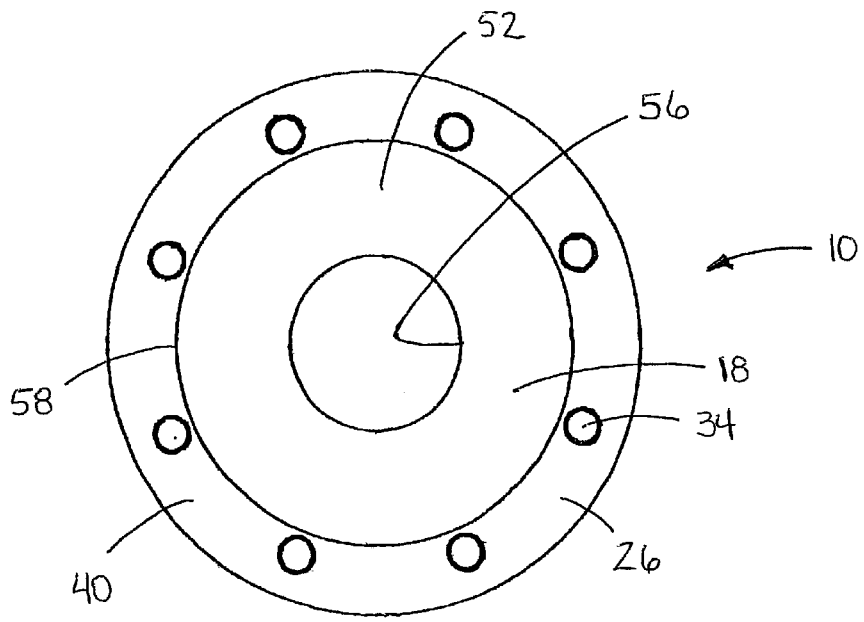
FIG. 1 is a top view of the flange connector of the present invention.

For the purpose of promoting an understanding of the principles of the invention, references will be made to the embodiment illustrated in the drawings. Specific language will also be used to describe the same. It will, nevertheless, be understood that no limitation of the scope of the invention is thereby intended, such alterations and further modifications in the illustrated device, and such further applications of the principles of the invention illustrated herein being contemplated as would normally occur to one skilled in the art to which the invention relates.

Figure 3:
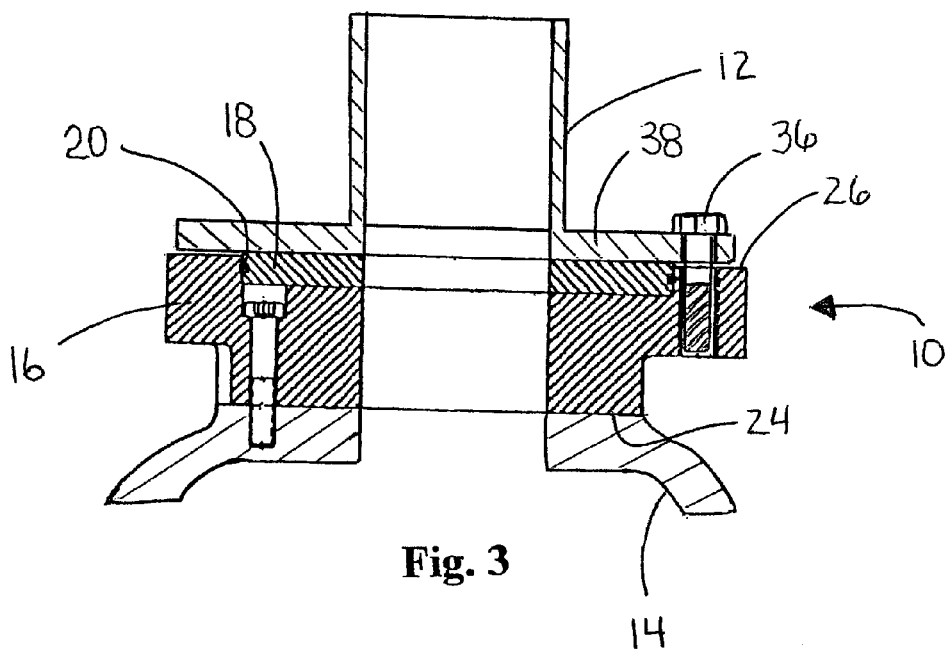
FIG. 3 cross-sectional view of the flange connector of FIG. 2, which is taken along line A—A shown in FIG. 2, connected to a pipe flange and pump housing.

The flange connector 10 as illustrated in FIG. 3 is adapted to connect an inlet or outlet conduit pipe 12 to a pump housing 14. The flange connector 10 is designed to be used primarily with process or manufacturing pumps that are used for bulk transfer of liquids such as chocolate, asphalt and high-temperature fluids, but can also be used with service pumps used to transfer liquids such as boiler or cooling water. The flange connector 10 is best illustrated in FIG. 4 comprised of a flange blank 16, an insert plate 18 and a seal member 20.

Figure 2:
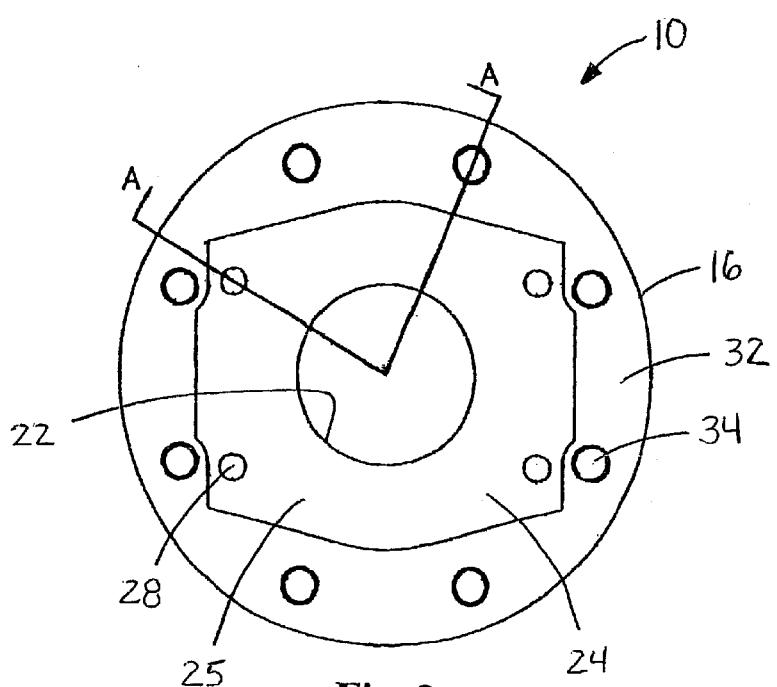
FIG. 2 is a bottom view of the flange connector of FIG. 1.
Figure 4:
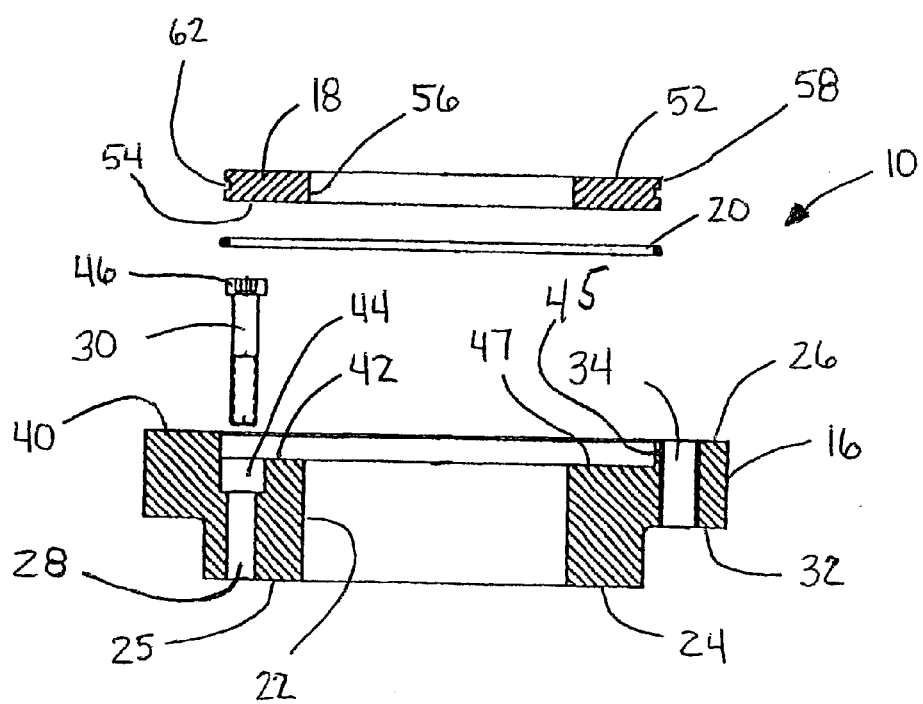
FIG. 4 is an exploded cross-sectional view of the flange connector of the present invention.

The flange blank 16 is adapted to be connected to the pump housing 14 and has a first side 24 and a spaced apart second side 26 as shown in FIGS. 2–4. The flange blank 16 also includes a central bore 22 extending from the first side 24 to the second side 26 that provides for the passage of fluid to or from the pump. The first side 24 includes a face 25 that surrounds the central bore 22. The face 25 is adapted to seal against the pump housing 14. The face 25 includes a plurality of apertures 28 that pass through the flange blank 16. The apertures 28 are adapted to accept bolts 30 or other fasteners that secure the flange blank 16 to the pump housing 14. The face 25 may be sealed against the pump housing 14 by use of a gasket (not shown) to assist in preventing leakage. The shape of the gasket is a mirror image of the face 25 and can be fabricated from rubber, plastic, cork or other materials know in the art. The first side 24 also includes a recessed deck portion 32 that surrounds the face 25. The deck portion 32 includes a plurality of threaded apertures 34 that are adapted to accept bolts 36 used to retain a pipe flange 38. The deck portion 32 is recessed from the face 25 for clearance purposes. Alternatively unthreaded apertures 34 may be used with nuts and bolts securing the flange 38 to the flange blank 16.

The second side 26 of the flange blank 16 is comprised of a raised ring portion 40 and a central recess 42 as shown in FIGS. 1 and 4. The ring portion 40 is concentrically positioned around the central recess 42 and forms the outer edge of the flange blank 16. The ring portion 40 includes the apertures 34 that are adapted to accept the pipe flange bolts 36.

The central recess 42, which is best shown in FIG. 4, is concentrically positioned around the central bore 22 and is adapted to accept the insert plate 18 and the seal 20. The recess 42 is defined by upstanding wall 45 and surface 47. The depth of the central recess 42 is less than the thickness of the insert plate 18, so that the upper surface of the insert plate 18, when installed, extends slightly above the surface of the ring portion 40 of the flange blank 16. This arrangement eliminates interference between the ring portion 40 and the pipe flange 38, which permits the insert plate 18 to seal tightly against the pipe flange 38 to prevent leakage. The central recess 42 also includes the apertures 28 that extend through the flange blank 16 to the face 25. The apertures 28 accept the bolts 30 that secure the flange blank 16 to the pump housing 14. The apertures 28 further include annular recesses 44 that allow the heads 46 of the bolts 30 to be positioned beneath the surface 47 of the central recess 42 allowing the insert plate 18 to be positioned flush against the surface 47 of the central recess 42. Allen head sockets in the bolt heads allow for tightening of the bolts 3. The surface 47 of the central recess 42 can also include an annular groove (not shown) surrounding the central bore 22, that is adapted to accept an O-ring or other seal member 20. The seal member 20 creates a seal between the insert plate 18 and the flange blank 16 to prevent the loss of fluid from the central bore 22.

The insert plate 18 is a disc-shaped member that includes an upper face surface 52 and a spaced apart lower surface 54, as shown in FIGS. 1 and 4. The insert plate 18 further includes a central bore 56 and an outer perimeter surface 58. The diameter of the central bore 56 is equal to the diameter of the central bore 22 of the flange blank 16 creating a uniform fluid passageway. The bottom surface 54 of the insert plate 18 is adapted to engage the central recess 42 of the flange blank 16. A gasket (not shown) may be used between the insert plate 18 and the flange blank 16 to create a seal between the members. The bottom surface 54 of the insert plate 18 may also include a plurality of recesses (not shown) that are adapted to accept the head of the bolts 30, in the event that they extend past the surface 47 of the central recess 42. The outer face surface 52 of the insert plate 18 extends past the ring portion 40 of the flange blank 16 when the insert plate 18 is installed and is adapted to seal against the pipe flange 38. The outer face surface 52 is adapted to accept a gasket (not shown) to seal the pipe flange 38 to the insert plate 18.

The outer perimeter surface 58 of the insert plate 18 is sized so that it is in close proximity to the side walls of the central recess 42 when the insert plate 18 is positioned within the flange blank 16. The outer perimeter surface 58 of the insert plate 18 includes a groove 62 that is adapted to accept the seal 20. The seal 20 seals the outer perimeter surface 58 of the insert plate 18 to the central recess 42 to prevent fluid under pressure from the central bore 22 from leaking outside the flange 10. When the insert plate 18 is positioned in the central recess 42 of the flange blank 16 and the pipe flange 38 is bolted to the flange blank 16, the bottom surface 54 of the insert plate 18 is in contact with the surface 47 of the central recess 42. During the course of pump operation, fluid entering the flange connector 10, may seep between the insert plate 18 and the flange blank 16 depending on the pressure of the fluid being pumped. Further fluid flow between the plate 18 and the flange blank 16 will be impeded by the seal 20 and will not be allowed to exit the flange 10. The seal 20 is preferably an O-ring seal having a rubber core and an exterior polymer layer surrounding the core to retard deterioration of the seal. Standard rubber O-rings may also be used.

The flange connector 10 is installed by placing a gasket or sealant around the inlet or outlet of the pump housing 14 where the flange 10 will be situated. Once the gasket is in place, the flange blank 16 is placed on the pump housing and bolts 30 are inserted through apertures 28 and tightened. Once the flange blank 16 is securely fastened to the pump housing, the insert plate 18 and seal 20 are placed within the central recess 42 of the flange blank 16. Once the insert plate 18 and seal 20 are properly positioned within the central recess 42 of the flange blank 16 a gasket or sealant is placed on the outer face surface 52 of the insert plate 18. The pipe flange 38 is then positioned over the insert plate 18 and the flange blank 16 and the bolts 36 are inserted through holes in the pipe flange 38 and threaded into apertures 34 of the ring portion 40. The bolts 36 are tightened to seal the pipe flange 38 to the flange connector 10, creating a leak free conduit between the pump housing 14 and the piping 12.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A pump flange comprising:

a flange blank having a first face adapted to be connected to a pump housing, and a second face adapted to be connected to a fluid conduit;

a central bore extending through said flange blank adapted to permit fluid flow;

a recess formed in said flange blank, concentric with said central bore, said recess having a first diameter;

said recess including a plurality of apertures adapted to allow for the passage of fasteners to secure said pump flange to the pump housing;

an insert plate adapted to be positioned within said recess, having a central bore extending through said insert plate, and a sealing member positioned between said insert plate and said flange blank adapted to seal said insert plate to said flange blank to prevent fluid leakage from the pump.

2. The pump flange of claim 1, wherein said flange blank further includes a plurality of apertures adapted to accept fasteners for securing said flange blank to the fluid conduit.

3. The pump flange of claim 1, wherein the outer perimeter of said insert plate includes a groove.

4. The pump flange of claim 3, wherein said groove is adapted to accept said sealing member.

5. The pump flange of claim 4, wherein said sealing member is an O-ring.

6. The pump flange of claim 1, wherein the diameter of said central bore of said insert plate is equal to the diameter of said central bore of said flange blank.

7. A flange for connecting a pump housing to a fluid conduit comprising:

a base member having a central opening adapted to allow for the passage of fluid, said base member adapted to be connected at one end to the fluid conduit and at another end to a pump housing, said base member further including a recess surrounding said central opening;

said recess includes a plurality of apertures adapted to accept fasteners to secure said flange to the pump;

a plate member having a central opening adapted to allow for the passage of fluid, said plate member dimensioned to allow placement within said recess, said plate member positioned between said base member and the pipe flange;

a seal member positioned between said base member and said plate member, said seal member adapted to prevent fluid leakage from said flange.

8. The flange of claim 7, wherein said base member further includes a plurality of apertures adapted to accept fasteners to secure said flange to the fluid conduit.

9. The flange of claim 7, wherein said plate member includes a groove extending around a perimeter of said plate member.

10. The flange of claim 9, wherein said groove is adapted to accept said seal member.

11. The flange of claim 10, wherein said seal member is an O-ring.

12. The flange of claim 7, wherein the diameter of said central opening of said plate member is equal to the diameter of said central opening of said base member.

13. A pump flange for mounting to a pump comprising:
a base member having a first mounting surfaced adapted to be connected to the pump and a second mounting surface adapted to be connected to a fluid conduit;
said base member including a bore passing therethrough;
a recess formed in said second mounting surface and surrounding said bore, said recess includes a plurality of apertures adapted to accept fasteners to secure said base member to the pump;
a plate member positioned within said recess and adapted to engage the fluid conduit, said plate member including a bore passing therethrough;
a seal attached to said plate member and adapted to create a seal between said base member and said plate member to prevent fluid loss from said bores.

14. The pump flange of claim 13, wherein said base member further includes a plurality of apertures adapted to accept fasteners to secure said base member to the fluid conduit.

15. The pump flange of claim 13, wherein said plate member includes a groove extending around a perimeter of said plate member.

16. The pump flange of claim 15, wherein said groove is adapted to accept said seal.

17. The pump flange of claim 16, wherein said seal is an O-ring.

18. The pump flange of claim 13, wherein the diameter of said bore of said plate member is equal to the diameter of said bore of said base member.

* * * * *